United States Patent
McEvilly et al.

(10) Patent No.: US 7,266,780 B2
(45) Date of Patent: Sep. 4, 2007

(54) METHOD FOR COMBINING DETERMINISTIC AND NON-DETERMINISTIC USER INTERACTION DATA INPUT MODELS

(75) Inventors: Carlos McEvilly, Cupertino, CA (US); Sreeram Balakrishnan, Los Altos, CA (US); Lu Chang, Capertino, CA (US); Jin Guo, Sunnyvale, CA (US); Sadik Kapadia, East Palo Alto, CA (US); Rudolf Schusteritsch, Mountain View, CA (US); Charles Yimin Wu, Palo Alto, CA (US)

(73) Assignee: Motorola, Inc., Schaumburg, IL (US)

( * ) Notice: Subject to any disclaimer, the term of this patent is extended or adjusted under 35 U.S.C. 154(b) by 801 days.

(21) Appl. No.: 10/610,070

(22) Filed: Jun. 30, 2003

(65) Prior Publication Data

US 2004/0264447 A1   Dec. 30, 2004

(51) Int. Cl.
*G06F 3/23* (2006.01)
*G09G 5/00* (2006.01)

(52) U.S. Cl. ..................................... 715/811; 715/854
(58) Field of Classification Search ........ 715/811–813, 715/744–747, 853–855, 705–706, 771–773, 715/831, 832, 822–824, 828–830; 345/168; 341/28, 20; 704/275; 434/169
See application file for complete search history.

(56) References Cited

U.S. PATENT DOCUMENTS

| | | | |
|---|---|---|---|
| 5,953,541 A * | 9/1999 | King et al. | 710/67 |
| 6,307,548 B1 * | 10/2001 | Flinchem et al. | 715/811 |
| 6,392,640 B1 * | 5/2002 | Will | 345/184 |
| 6,407,679 B1 * | 6/2002 | Evans et al. | 341/20 |
| 6,646,573 B1 * | 11/2003 | Kushler et al. | 341/28 |
| 6,810,272 B2 * | 10/2004 | Kraft et al. | 455/566 |
| 7,143,045 B2 * | 11/2006 | Sekiguchi | 704/275 |
| 2002/0126097 A1 * | 9/2002 | Savolainen | 345/168 |
| 2003/0067495 A1 * | 4/2003 | Pu et al. | 345/811 |
| 2003/0197744 A1 * | 10/2003 | Irvine | 345/856 |
| 2004/0140956 A1 * | 7/2004 | Kushler et al. | 345/168 |
| 2004/0249650 A1 * | 12/2004 | Freedman et al. | 705/1 |
| 2006/0216678 A1 * | 9/2006 | De Ley et al. | 434/169 |

* cited by examiner

Primary Examiner—Steven Sax

(57) ABSTRACT

A structure and method for entering data into an electronic device (110). A deterministic data input element (130) coupled to the electronic device (110) is operable to accept a user-selected data input. Modulation of a motion of a non-deterministic data input element (140) coupled to the electronic device (11) is operable to select a varying precision of data input choices. A feedback element (120) coupled to one or more of the deterministic data input element (130) and the non-deterministic data input element (140) presents the data input choices to the user. The user enters data into electronic device (110) using one of the deterministic input element (130) and the non-deterministic input element (140) and the feedback element (120) displays a sequence of data choices to the user. The user then navigates a tree of possible data completions in order to select a particular data completion to be entered into the electronic device (110).

7 Claims, 11 Drawing Sheets

METHOD FOR COMBINING DETERMINISTIC AND NON-DETERMINISTIC USER INTERACTION DATA INPUT MODELS

TECHNICAL FIELD

This invention relates generally to the field of data input devices, and more specifically to techniques and structures for entering data into electronic devices.

BACKGROUND OF THE INVENTION

Electronic devices are becoming smaller and more powerful, with more functionality packed into a smaller physical footprint. The power of these electronic devices and their capabilities imply the use of a fully featured data entry element to allow a user to access these capabilities. Providing these capabilities to a user makes the design of the data entry element challenging. Input devices of larger electronic devices can be used, at the expense of wasting the potential small footprint. Small input devices can be used, but these small input devices tend to be limited in functionality and difficult to access. One method for allowing input of a wide range of items is to list items for user selection, but this requires menu lists of unwieldy length.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION OF THE INVENTION

Figure 1:
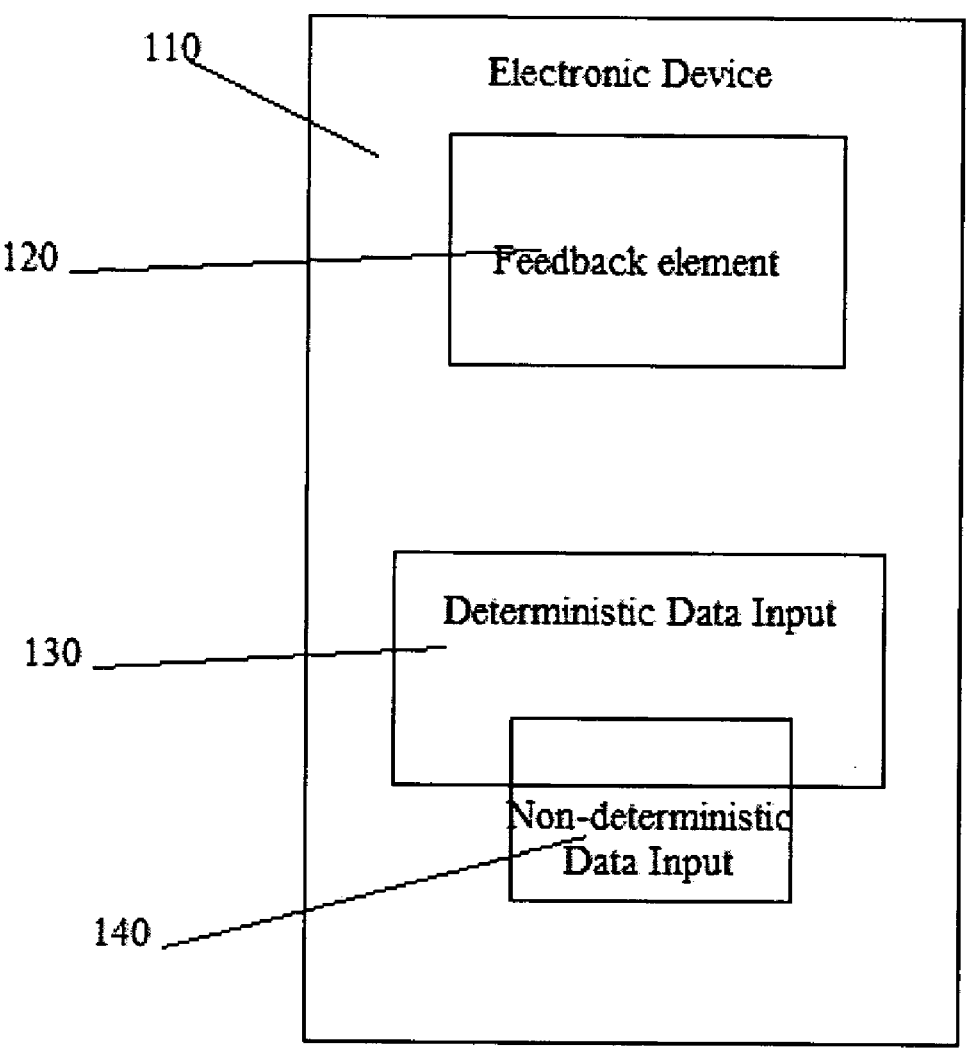
FIG. 1 is a diagram of a general physical structure for combining deterministic and non-deterministic user interaction data input models, in accordance with certain embodiments of the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

Referring now to FIG. 1 a diagram of a general physical structure 100 for combining deterministic and non-deterministic user interaction data input models is shown, in accordance with certain embodiments of the present invention. The general structure 100 illustrates an electronic device 110 coupled to a deterministic data input element 130 and a non-deterministic data input element 140. Electronic device 110 may be, for example, one of a telephone, pager, cellular phone, computer, PDA, MP3 players, wristwatch, data entry device, data storage device, signal processing device. It is noted that the deterministic data input element 130 and the non-deterministic data input element 140 may physically overlap. A feedback element 120 is coupled to the electronic device 110 and further operable to be coupled to one or more of the deterministic data input element and non-deterministic data input element 140. The diagram of FIG. 1 illustrates one potential physical organization operable to combine deterministic and non-deterministic user interaction data input models, although it is noted that other organizations are possible without departing from the spirit and scope of the present invention. As an illustration of exemplary embodiments, one or more of deterministic data input element 130, non-deterministic data input element 140, and feedback element 120 may be physically separate from electronic device 110. This situation may occur, for example, when the electronic device 110 accepts wireless transmission of data. Additionally, non-deterministic data input element 140 and deterministic data input element 130 may be physically separate or non-deterministic data input element 140 may reside within deterministic data input element 130 without departing from the spirit and scope of the present invention.

Figure 2:
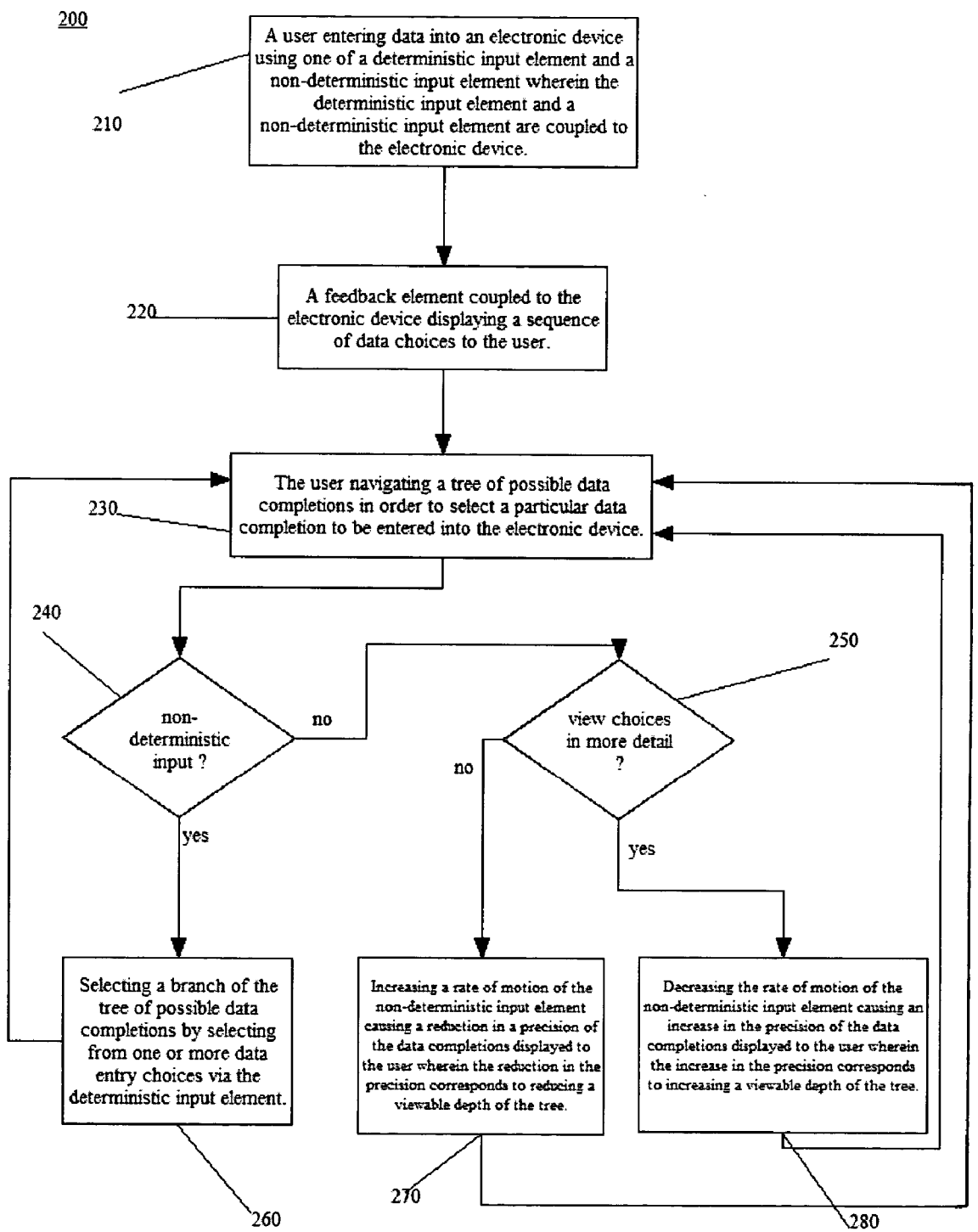
FIG. 2 is a flowchart of a general method for combining deterministic and non-deterministic user interaction data input models, in accordance with certain embodiments of the present invention.

The data of electronic device 110 may be digital data, alphanumeric character data, non-Western characters such as Chinese, audio data, video data, descriptive metadata, Internet data, for example, or any other such examples of data. In certain embodiments of the present invention, the deterministic data input element 130 allows a user to select and enter data into the electronic device using a fixed data input technique, such as using a keypad or keyboard. In certain embodiments of the present invention, non-deterministic data input element 140 allows a user to select data using techniques wherein a user action determines an amount of precision and a length of time with which data is displayed for selection. Referring now to FIG. 2 a flowchart of a general method 200 for combining deterministic and non-deterministic user interaction data input models is shown, in accordance with certain embodiments of the present invention. The general method 200 is started by a user entering data into electronic device 110 by one of deterministic input element 130 and a non-deterministic input element 140 (block 210). Feedback element 120 is operable to display a sequence of data choices to the user (block 220). In certain embodiments of the present invention, feedback element 120 is a graphical display. It is noted that feedback element 120 is operable to include one or more of audio elements, video elements, or haptic elements so that a user may interact with electronic device 110 audially, graphically or haptically. The word "display" as used in this document should be taken to include all such modalities. The user interacts with feedback element 120 to navigate a tree of possible data completions to select a particular data completion that is operable to be entered in electronic device 110 (block 230). If a user decides to use non-deterministic data input techniques as in block 240, then the user may select a branch of the tree of possible data completions by selecting from one or more data entry choices (block 260). The user may then again navigate the tree of possible data completions as in block 230.

If a user decides to use non-deterministic data input techniques, then the user may view possible data completions in more detail (yes in block 250) by decreasing a rate of motion or the extent of deflection of non-deterministic data input element 140 wherein the decrease of the rate of motion or extent of deflection is operable to increase the precision of the possible data completions displayed to the user. The increase in the precision of the possible data completions displayed to the user corresponds to increasing a viewable depth of the tree (block 280). The user may also view possible data completions more rapidly and in less detail (no in block 250) by increasing a rate of motion or extent of deflection of non-deterministic data input element 140 wherein the increase in the rate of motion or extent of deflection is operable to decrease the precision of the possible data completions displayed to the user. The decrease in the precision of possible data completions displayed to the user corresponds to decreasing a viewable depth of the tree (block 270). After increasing or decreasing the rate of motion or extent of deflection of non-deterministic data input element 140, the user may then again navigate the tree of possible data completions as in block 230. It is noted that the user may alternate between increasing or decreasing the rate of motion or extent of deflection of the non-deterministic data input element 140. In certain embodiments of the present invention, stopping the motion of the non-deterministic data input element, or placing of such element in a neutral (less-deflected or undeflected) position, 140 is operable to display a full precision of the possible data completions. It is also noted that data that is more probable is operable for be displayed for a longer length of time or for a longer range of motion of non-deterministic data input element 140 than data that is less probable. In certain embodiments of the present invention, probabilities of the possible data elements are operable to be determined by reference to a dictionary of possible data entry choices and the probability of said possible data entry choices are determined from a statistical measurement of a usage of said possible data entry choices.

It is noted that in certain embodiments of the present invention, the deterministic data input element 130 and the non-deterministic data element 140 may be used jointly to perform special operations such as selecting one or more displayed items, transmitting the one or more displayed items to a second electronic device, or receiving the one or more displayed items from one or more remote electronic devices. As an example, if the deterministic data input element 130 is a keypad and the non-deterministic data element 140 is a wheelpad wherein the user may hold down a key of the keypad while rotating the wheelpad to produce special operations.

Figure 3:
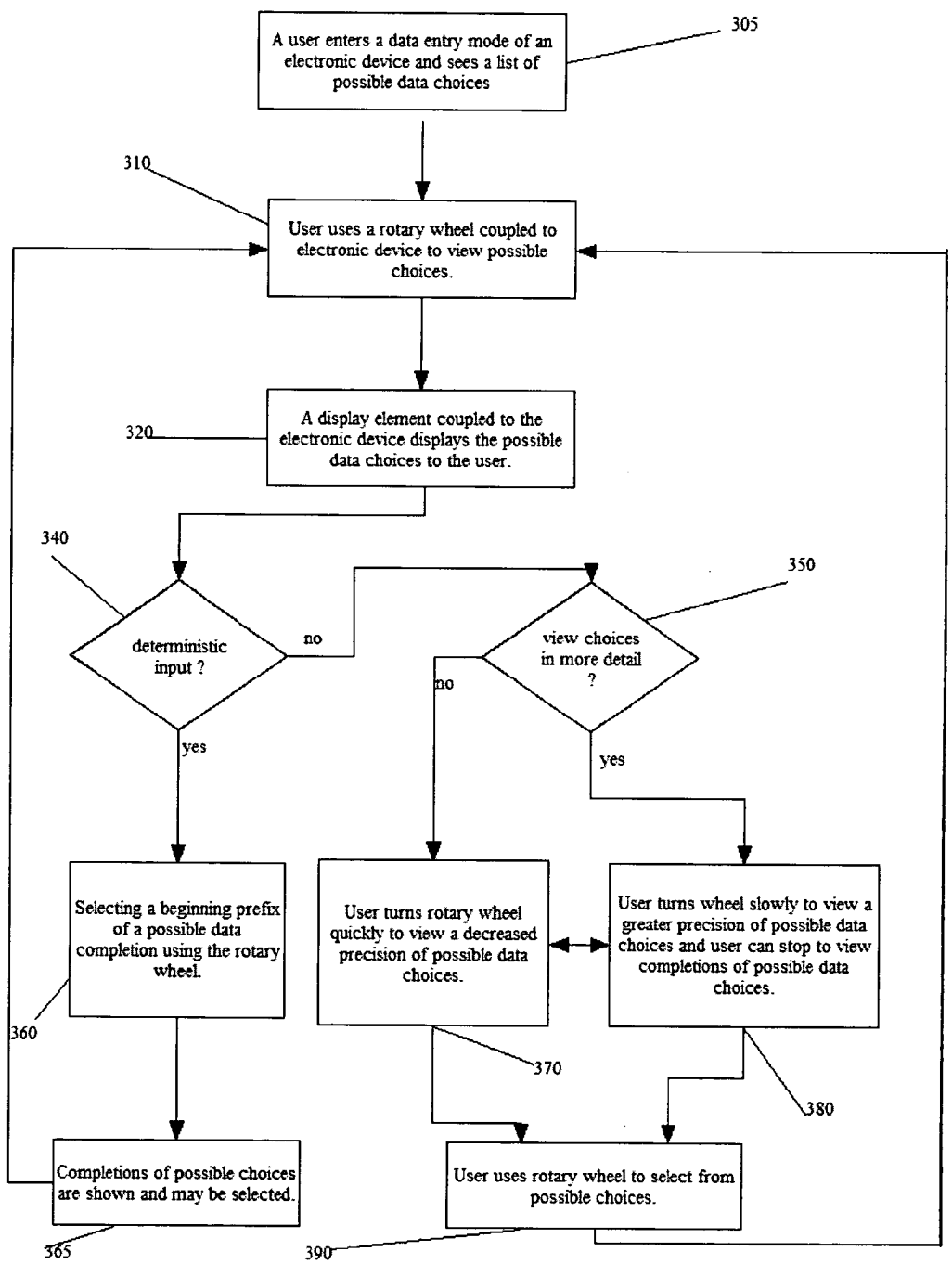
FIG. 3 is a flowchart of a first exemplary method for combining deterministic and non-deterministic user interaction data input models, in accordance with certain embodiments of the present invention.

Referring now to FIG. 3 a flowchart of a first exemplary method 300 for combining deterministic and non-deterministic user interaction data input models is shown, in accordance with certain embodiments of the present invention. The first exemplary method 300 is started by a user entering a data entry mode of an electronic device and accessing a list of possible choices (block 305). The user uses a display modulation element, such as a slider, linear slider, rotary wheel or button, dial, thumbwheel or other motion-sensing device, coupled to the electronic device to view possible choices (block 310). A display element coupled to the electronic device displays possible data choices to the user (block 320). If a user selects deterministic data input (block 340), then a beginning prefix of possible data completions is made using the slider or rotary wheel as in block 360. Completions of possible choices may then be shown to the user (block 365) and the user interacts with the slider or rotary wheel to view the possible choices as in block 310.

If a user decides to use non-deterministic data input techniques, then the user may view possible data completions in more detail (yes in block 350) by turning the slider or rotary wheel slowly, or deflecting it to a lesser extent, to view a greater resolution of possible data choices. The user can also stop the slider or rotary wheel, or allow it to rest at its neutral position, to view completions of possible data choices (block 380). The user may also view possible data completions more rapidly and in less detail (no in block 350) by turning the slider or rotary wheel more rapidly or by deflecting it to a greater extent (block 370). After increasing or decreasing a motion or deflection of slider or rotary wheel, the user may then use the slider or rotary wheel to select possible data completions as in block 390. The user may then continue using the slider or rotary wheel to view possible choices as in block 310. It is noted that data that is more probable is operable to be displayed for a longer length of time or for a greater range of motion of the slider or rotary wheel than data that is less probable. In certain embodiments of the present invention, probabilities of the possible data elements are operable to be determined by reference to a dictionary of possible data entry choices and the probability of said possible data entry choices are determined from a statistical measurement of a usage of said possible data entry choices.

Figure 4:
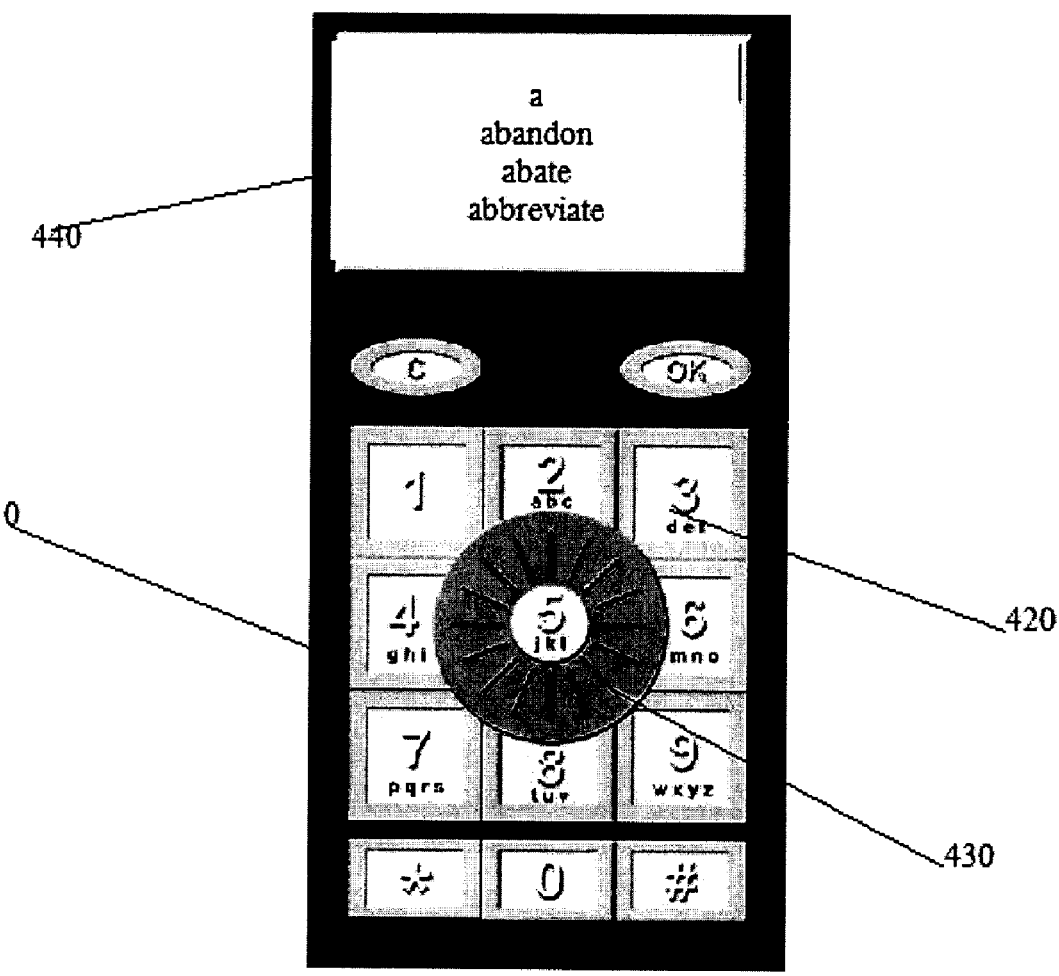
FIG. 4 is a first image of a first exemplary structure for combining deterministic and non-deterministic user interaction data input models, in accordance with certain embodiments of the present invention.

Referring now to FIG. 4 a first image 400 of a first exemplary structure for combining deterministic and non-deterministic user interaction data input models is shown, in accordance with certain embodiments of the present invention. The first image 400 illustrates an electronic device 410, wherein said electronic device is coupled to a display element 440, coupled to a keypad 420, and coupled to wheelpad 430. It is noted that keypad 420 may be a keyboard without departing from the spirit and scope of the present invention. In accordance with a method of the first exemplary structure, a user enters a text mode and views a list of words using display element 440. The user can then use wheelpad 430 to scroll through the list of words.

Figure 5:
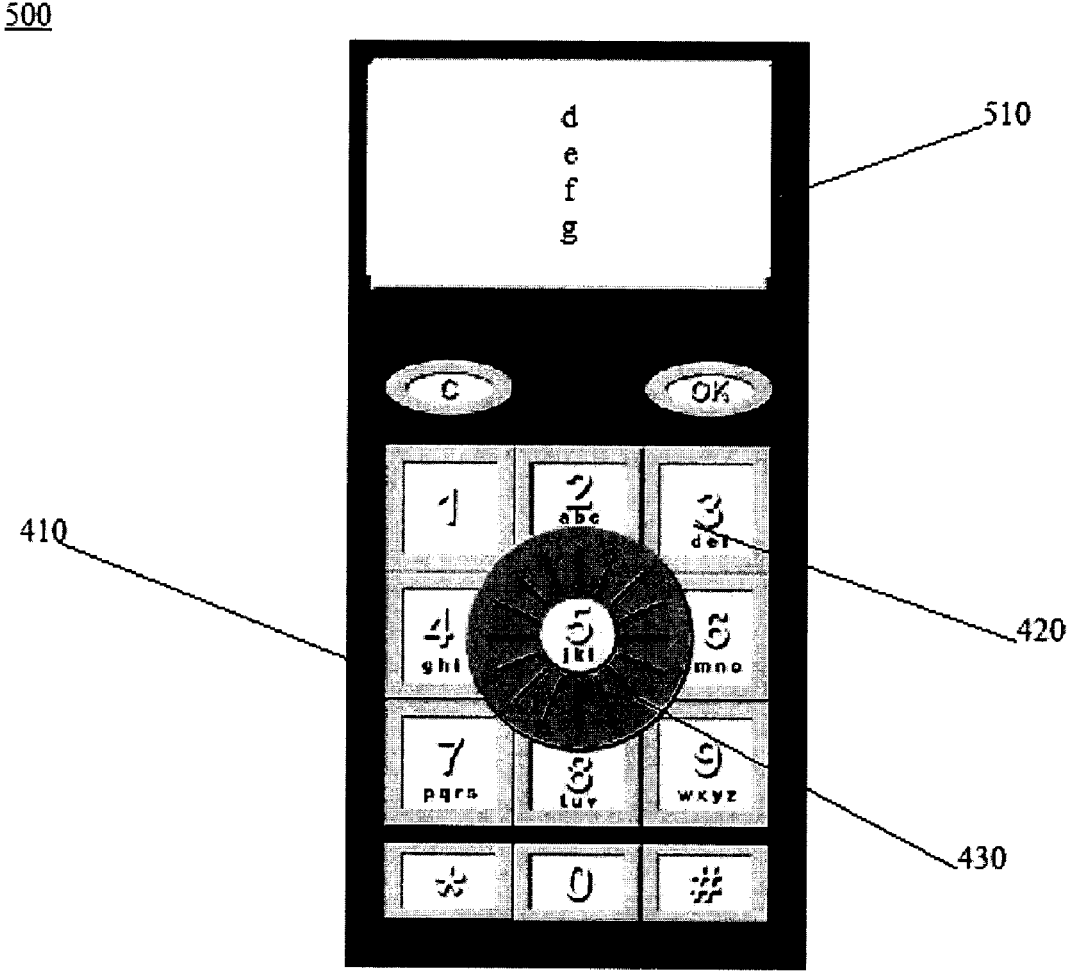
FIG. 5 is a second image of a first exemplary structure for combining deterministic and non-deterministic user interaction data input models, in accordance with certain embodiments of the present invention.
Figure 6:
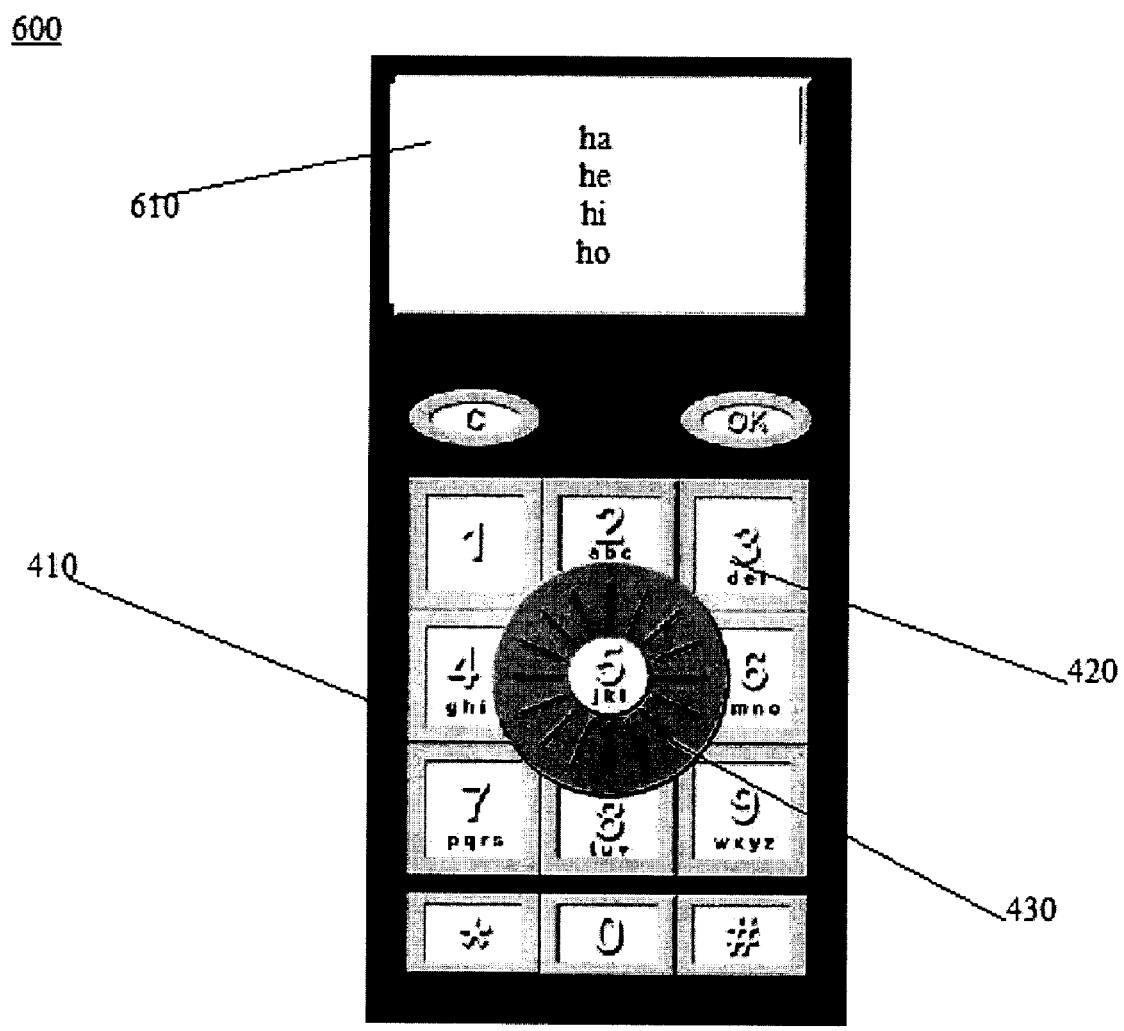
FIG. 6 is a third image of a first exemplary structure for combining deterministic and non-deterministic user interaction data input models, in accordance with certain embodiments of the present invention.

Referring now to FIG. 5 a second image 500 of a first exemplary structure for combining deterministic and non-deterministic user interaction data input models is shown, in accordance with certain embodiments of the present invention. Second image 500 illustrates that a user can scroll quickly through the list of words so that only the first letters 510 of words are shown. Referring now to FIG. 6 a third image 600 of a first exemplary structure for combining deterministic and non-deterministic user interaction data input models is shown, in accordance with certain embodiments of the present invention. Third image 600 illustrates that as the user turns the wheelpad 430 more slowly than in second image 500, prefixes 610 of the list of words are shown in display element 440.

Figure 7:
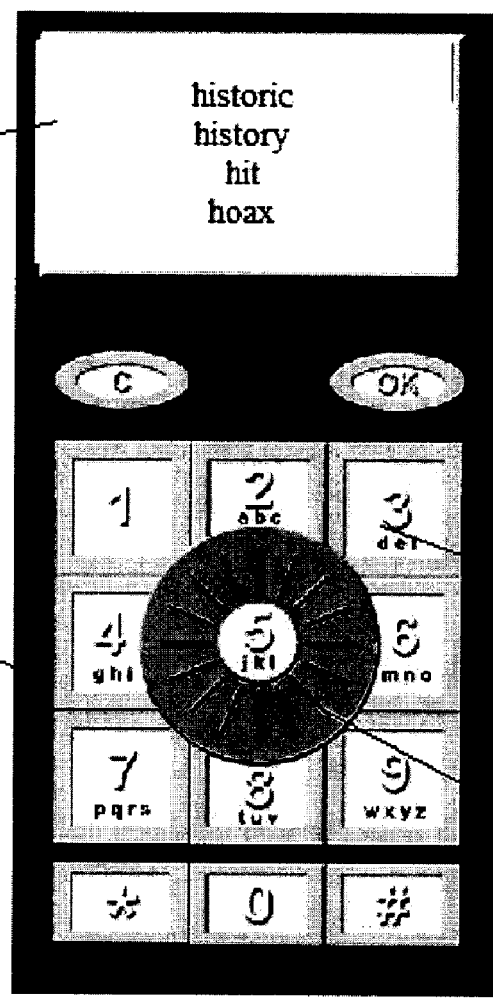
FIG. 7 is a fourth image of a first exemplary structure for combining deterministic and non-deterministic user interaction data input models, in accordance with certain embodiments of the present invention.
Figure 8:
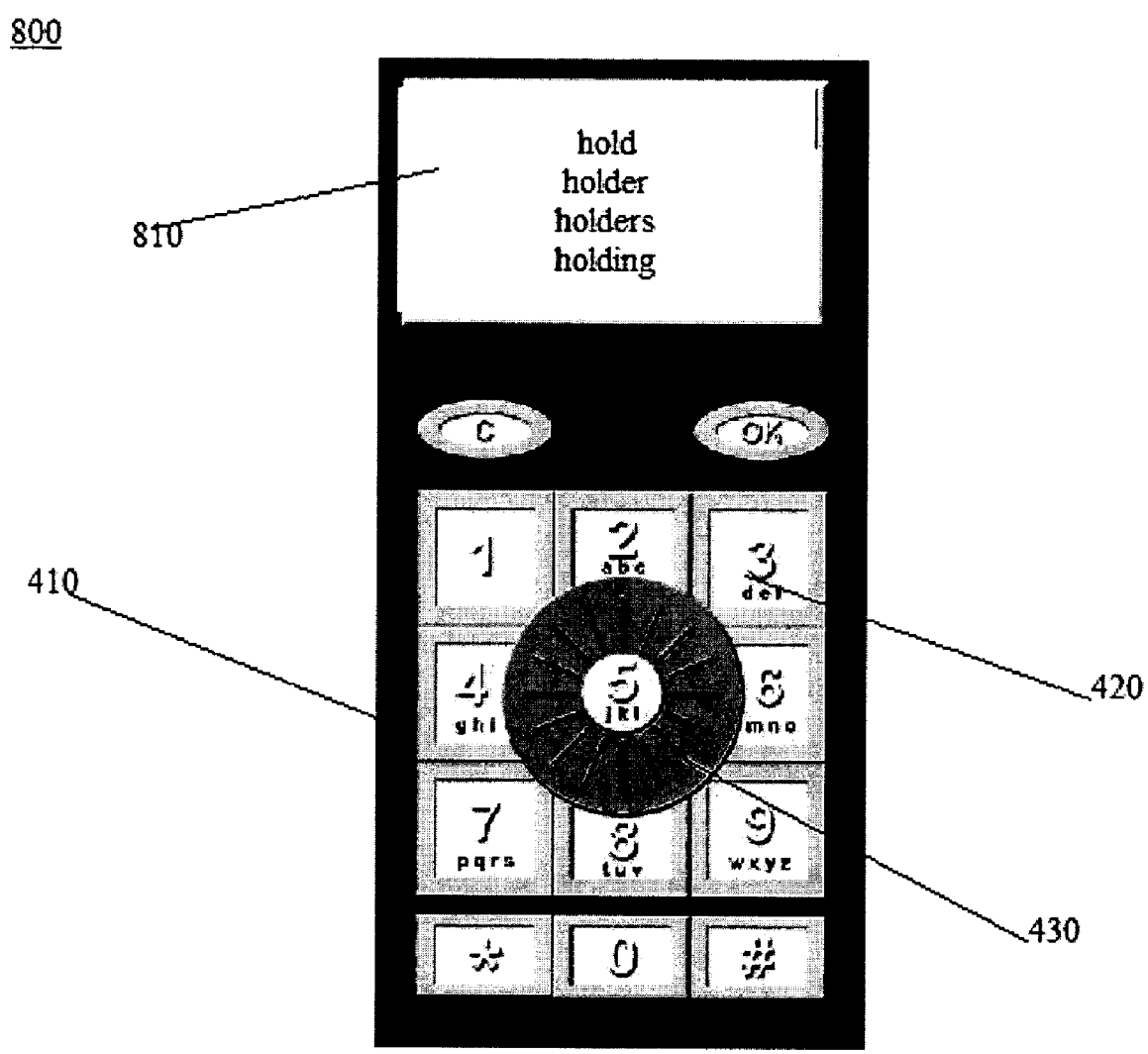
FIG. 8 is a fifth image of a first exemplary structure for combining deterministic and non-deterministic user interaction data input models, in accordance with certain embodiments of the present invention.

Referring now to FIG. 7 a fourth image 700 of a first exemplary structure for combining deterministic and non-deterministic user interaction data input models is shown, in accordance with certain embodiments of the present invention. If the user stops turning the wheelpad or, in the case of a wheel with a self-orienting mechanism allows the wheelpad to rest in its neutral position 430, then entire words 710 are shown in display element 440. Referring now to FIG. 8 a fifth image 800 of a first exemplary structure for combining deterministic and non-deterministic user interaction data input models is shown, in accordance with certain embodiments of the present invention. The fifth image illustrates that after entire words 710 are displayed, the user may scroll through the list one word at a time 810. It is noted that in certain embodiments of the present invention, the user may scroll in a forward or a reverse direction using wheelpad 430. Stopping or allowing to rest in its neutral position, the wheelpad 430 is operable to show a list of expanded words at a location where the wheel is stopped.

Figure 9:
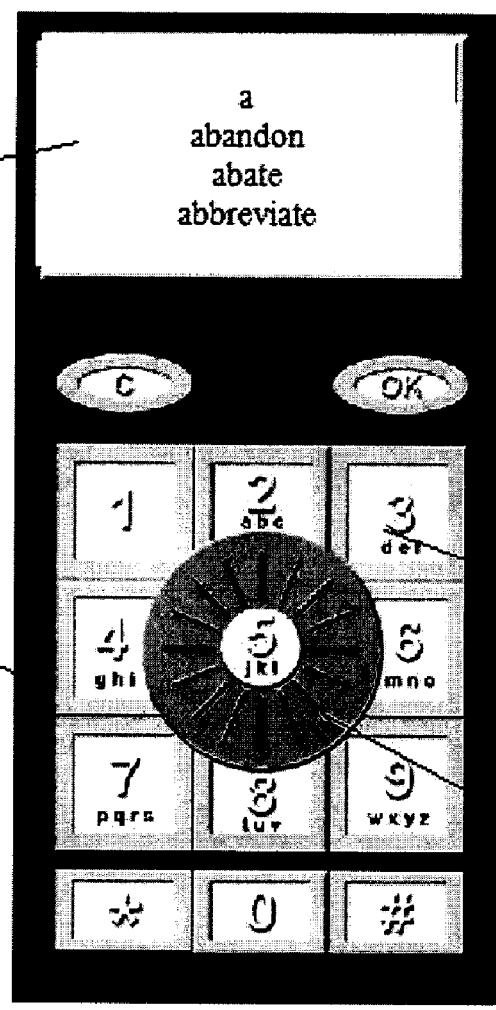
FIG. 9 is a sixth image of a first exemplary structure for combining deterministic and non-deterministic user interaction data input models, in accordance with certain embodiments of the present invention.
Figure 10:
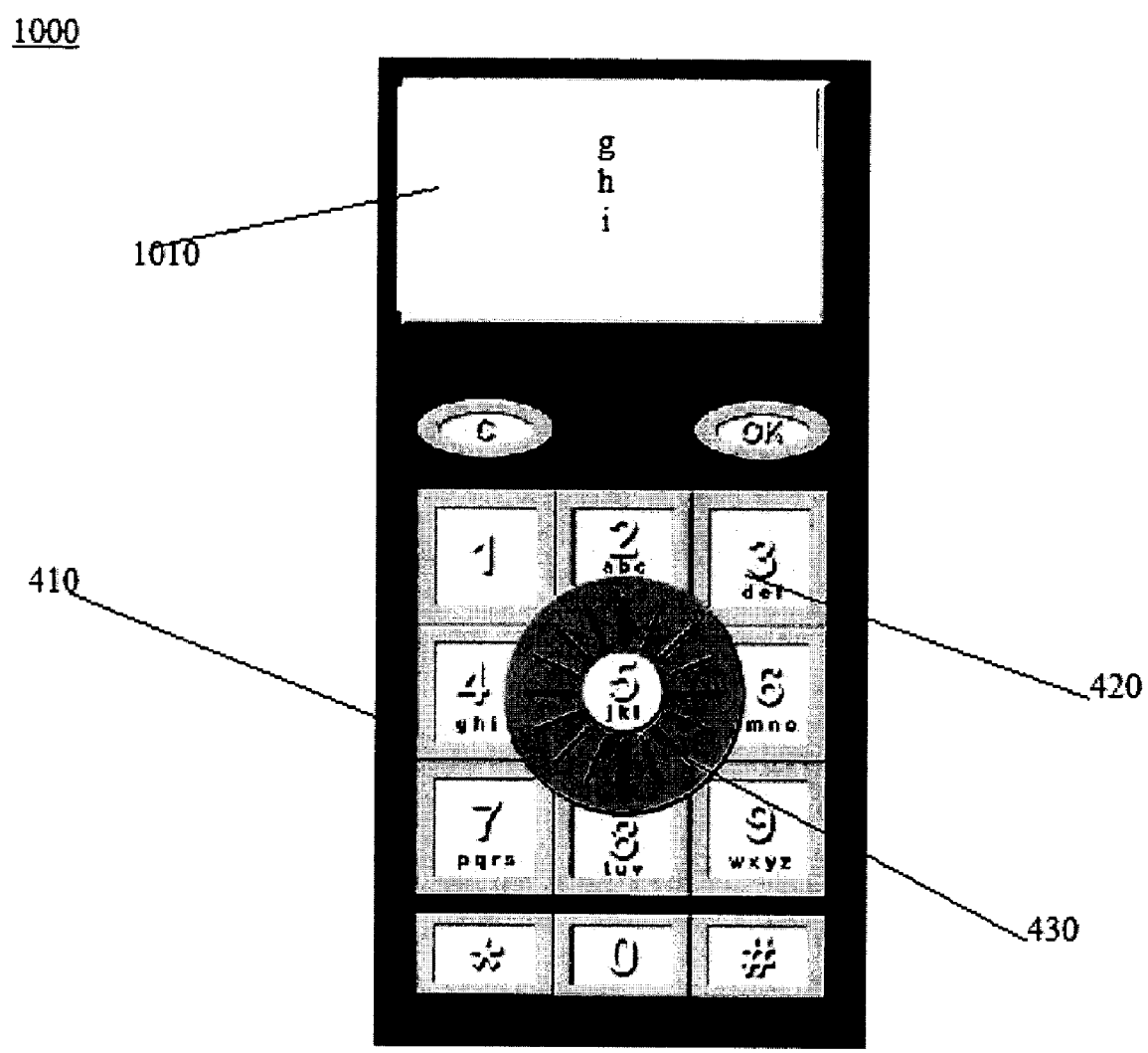
FIG. 10 is a seventh image of a first exemplary structure for combining deterministic and non-deterministic user interaction data input models, in accordance with certain embodiments of the present invention.
Figure 11:
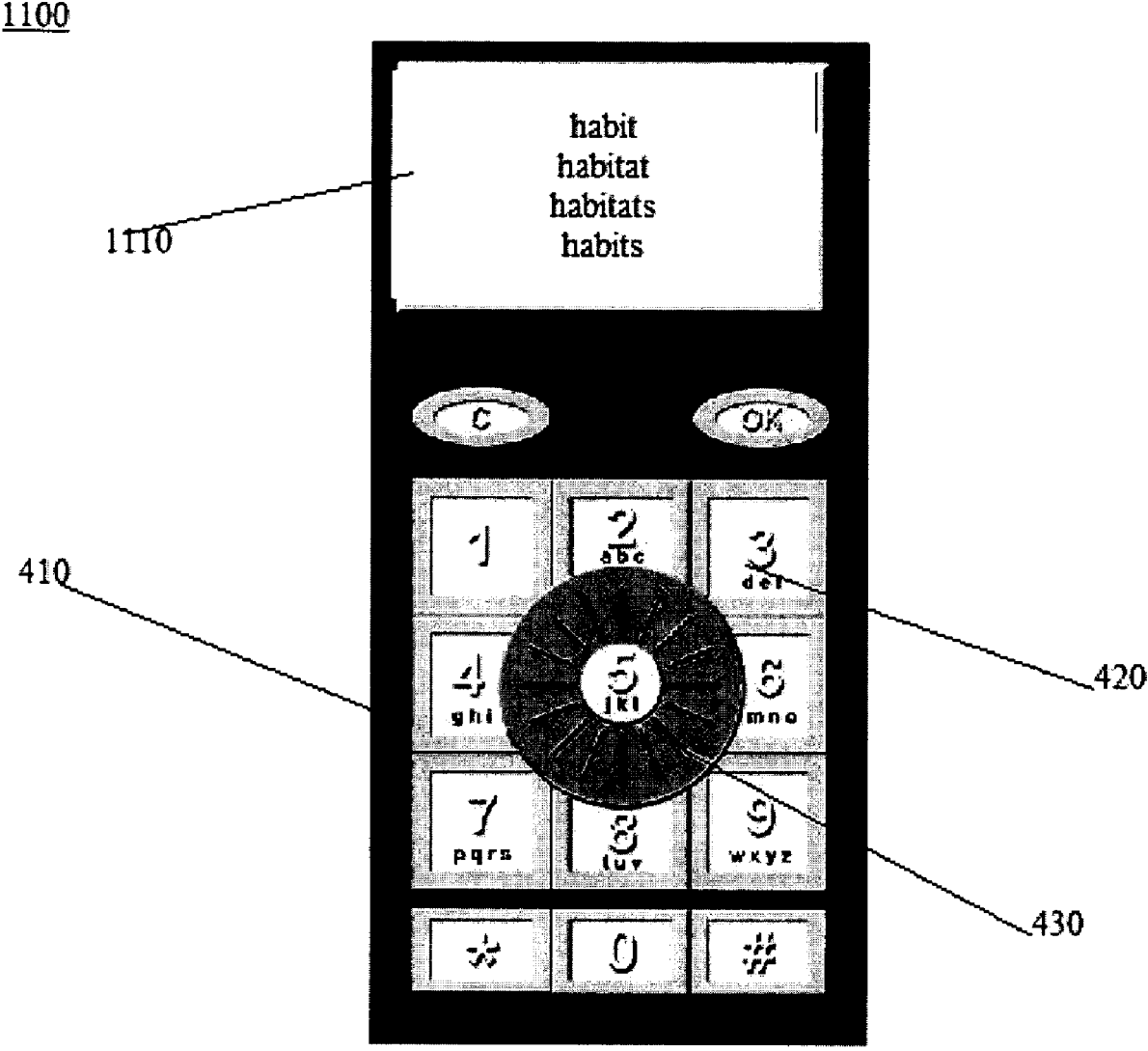
FIG. 11 is an eighth image of a second exemplary structure for combining deterministic and non-deterministic user interaction data input models, in accordance with certain embodiments of the present invention.

FIGS. 9, 10 and 11 illustrate that users may also use keypad 420 for deterministic input to the electronic device. As an example, if the user presses the '4' key on keypad 420, then referring now to FIG. 9 with a sixth image 1100 of a second exemplary structure for combining deterministic and non-deterministic user interaction data input models as a starting point, the letters 'g h i' 1010 are displayed to the user as in ninth image 1000 of FIG. 10. Referring now to FIG. 11 an eleventh image 1100 of a second exemplary structure for combining deterministic and non-deterministic user interaction data input models is shown, in accordance with certain embodiments of the present invention. Eleventh image 1100 illustrates that after the user presses the 'h' key on keypad 420, then a list words beginning with 'h' 1110 are displayed to the user. The user can then use wheelpad 430 to access these words 1110, their prefixes, and the starting letters of each word depending upon the speed with which wheelpad 420 is turned.

It is noted that although wheelpad 420 is used in the first exemplary structure, other non-deterministic devices could be used such as linear sliders, rotary buttons, dials, thumb-wheels or other motion sensing device without departing from the spirit and scope of the present invention. It is further noted that although display element 440 is illustrated as a graphical display, other user feedback models could be used such as audio elements or combinations of audio and graphical feedback elements. It is also noted that although the first exemplary structure illustrates wheelpad 430 centered on '5' key of kepad 420, other configurations are possible such as locating wheelpad 430 to a side of electronic device 410 or locating wheelpad 430 on a different key of kepad 420.

Given the limitations of known data entry structures and methods, it can be seen that the method and structure of the present invention are much improved. Input data may be quickly and easily input to electronic devices that are, for size or other reasons, unable to accommodate traditional data entry structures. The present invention additionally provides an input structure that allows eyes-free input that may be carried out without necessarily looking at a visual display; at the same time, the input process is faster or more efficient if the user is in a position to look at an input display. Furthermore, the input method should be easily usable without a steep learning curve. Finally, the input method can be integrated, without conflicting with the existing user interface, on top of traditional input methods to complement familiar input methods with new, productivity-enhancing functionality.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A method for the entering alphanumeric or non-Western character based data into an electronic device, comprising:

a user entering data into an electronic device using a deterministic input element and a non-deterministic input element wherein the deterministic input element and a non-deterministic input element are coupled to the electronic device;

a feedback element coupled to the electronic device displaying a sequence of data choices to the user;

the user navigating a tree of possible data completions in order to select a particular data completion to be entered into the electronic device, further comprising:

selecting a branch of the tree of possible data completions by selecting from one or more data entry choices via the deterministic input element;

increasing a rate of motion or extent of deflection of the non-deterministic input element causing a reduction in a precision of the data completions displayed to the user wherein the reduction in the precision corresponds to reducing a viewable depth of the tree; and decreasing the rate of motion or extent of deflection of the non-deterministic input element causing an increase in the precision of the data completions displayed to the user wherein the increase in the precision corresponds to increasing a viewable depth of the tree.

the user stopping the motion or releasing the deflection of the non-deterministic input element in order to display a full precision of the data completions displayed to the user.

2. A method for the entering of data into an electronic device, comprising:

a user entering alphanumeric or non-Western character based data into an electronic device using a deterministic input element and a non-deterministic input element wherein the deterministic input element and a non-deterministic input element are coupled to the electronic device;

a feedback element coupled to the electronic device displaying a sequence of data choices to the user;

the user navigating a tree of possible data completions in order to select a particular data completion to be entered into the electronic device, further comprising:
  selecting a branch of the tree of possible data completions by selecting from one or more data entry choices via the deterministic input element;
  increasing a rate of motion or extent of deflection of the non-deterministic input element causing a reduction in a precision of the data completions displayed to the user wherein the reduction in the precision corresponds to reducing a viewable depth of the tree;
  and decreasing the rate of motion or extent of deflection of the non-deterministic input element causing an increase in the precision of the data completions displayed to the user wherein the increase in the precision corresponds to increasing a viewable depth of the tree;
wherein data entry choices with a higher probability of occurrence are displayed for a longer time than data entry choices with a lower probability of occurrence.

3. The method of claim 2, wherein the probability of occurrence of the data entry choices are determined by reference to a dictionary of possible data entry choices and the probability of said possible data entry choices are determined from a statistical measurement of a usage of said possible data entry choices.

4. The method of claim 1, wherein data entry choices with a higher probability of occurrence are displayed for a longer amount of motion or extent of deflection of the display modulation element than data entry choices with a lower probability of occurrence.

5. The method of claim 1, further comprising the user combining the motion of the non-deterministic element with an action of the deterministic element to perform one or more of:
  selecting one or more displayed items;
  deselecting one or more displayed items;
    transmitting the one or more displayed items to a second electronic device;
  receiving the one or more displayed items from one or more remote electronic devices;
  optionally performing any of the above automatically after a suitable timeout.

6. The method of claim 2, wherein data entry choices with a higher probability of occurrence are displayed for a longer amount of motion or extent of deflection of the display modulation element than data entry choices with a lower probability of occurrence.

7. The method of claim 2, further comprising the user combining the motion of the non-deterministic element with an action of the deterministic element to perform one or more of:
  selecting one or more displayed items;
  deselecting one or more displayed items;
    transmitting the one or more displayed items to a second electronic device;
  receiving the one or more displayed items from one or more remote electronic devices;
  optionally performing any of the above automatically after a suitable timeout.

* * * * *